Nov. 12, 1935.   Z. C. BRADFORD   2,020,764
MOTOR MOUNTING AND BELT TIGHTENER
Filed July 2, 1934
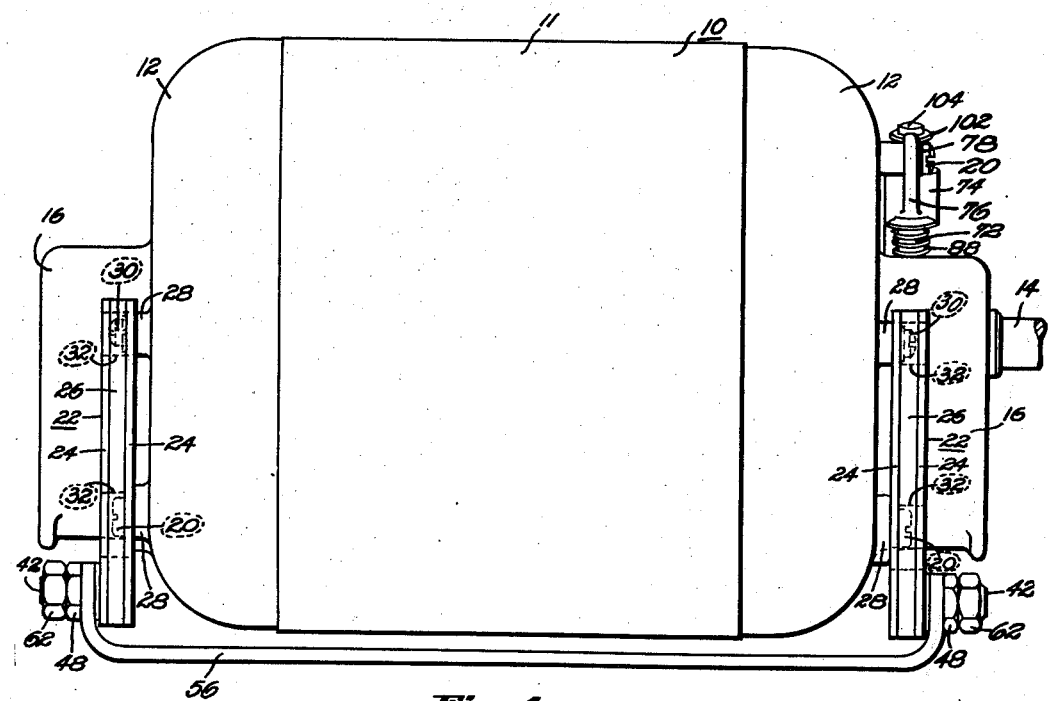
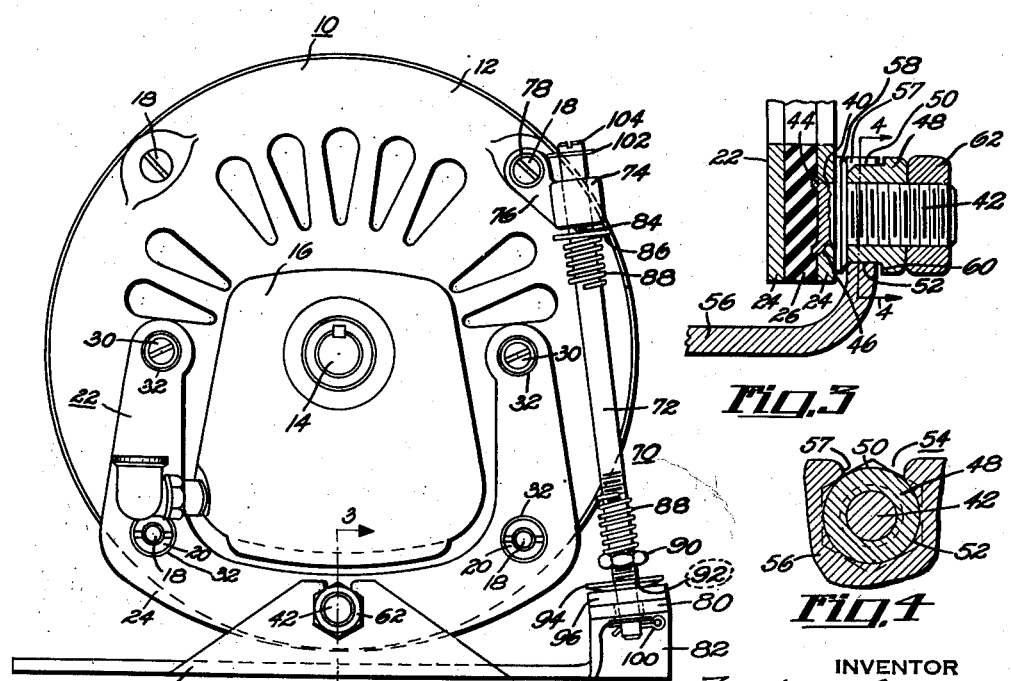
INVENTOR
Zerbe C. Bradford
BY
Spencer Hardman & Fehr
his ATTORNEYS Patented Nov. 12, 1935

2,020,764

UNITED STATES PATENT OFFICE 2,020,764

MOTOR MOUNTING AND BELT TIGHTENER

Zerbe C. Bradford, Dayton, Ohio, assignor to General Motors Corporation, Detroit, Mich., a corporation of Delaware Application July 2, 1934, Serial No. 733,364

13 Claims. (Cl. 248—26)

This invention relates to motor mountings and belt tighteners particularly of a motor noise and motor vibration absorbing type.

It is an object of the present invention to provide a pivotal mounting for an electric motor which will dampen the starting shock and all vibrations set up in the motor and thus render its operation more quiet.

It is another object of the present invention to provide a motor noise and motor vibration absorbing device which normally yieldingly rocks the motor about its pivotal mounting in a direction such as to tighten a belt which is driven by the motor.

Further objects and advantages of the present invention will be apparent from the following description, reference being had to the accompanying drawing wherein a preferred embodiment of the present invention is clearly shown.

In the drawing:

Fig. 1 is a side elevation of an electric motor and its support embodying part of the present invention.

Fig. 2 is an end elevation of the motor and its support and showing also a belt tightener.

Fig. 3 is an enlarged fragmentary section taken on the line 3—3 of Fig. 2.

Fig. 4 is a fragmentary section taken on the line 4—4 of Fig. 3.

Referring to the drawing, the reference numeral 10 generally designates an electric motor having a motor frame 11 and end frames 12 which provide bearings (not shown) for the motor shaft 14 and any conventional lubricating devices 16 for the proper lubrication of the motor shaft. The end frames 12 are secured to the motor frame 11 by conventional thru-bolts 18 and cooperating nuts 20. Mounting on each end frame in a manner to be described presently is a supporting bracket 22 which comprises two substantially U-shaped metallic members 24 and an intermediate part 26 of soft rubber which is vulcanized or otherwise secured to the two metallic members 24. That member 24 of each bracket 22 which is adjacent an end frame 12 is secured to bosses 28 thereof by means of head screws 30 and two of the thru-bolts 20. Each bracket 22 is provided with four annular recesses 32 which provide a passage for the heads of the screws 30 and the nuts 20 which are threadedly received by the thru-bolts 18. It follows from the preceding that those members 24 of the brackets 22 which are remote from the end frames 12 are secured to the latter solely by intermediation of the rubber parts 26.

Referring more particularly to Figs. 1, 3 and 4, one of the members 24 of each bracket 22 is provided with a hole 40 through which extends a bolt 42 which is provided with an integral head 44, engaging a counter-sunk portion 46 of the hole 40, thereby preventing removal of the bolt from the bracket. Of course each bolt 42 is located in a member 24 before a rubber part 26 is vulcanized thereto. Threaded over each bolt 42 is a nut 48, having a reduced annular portion 50 which normally bears against the annular portion 52 of a slot 54 in a motor base 56. The annular portion 52 of each slot 54 merges into a narrower slot portion 57 through which a bolt 42 may pass but not the reduced portion 50 of a nut 48. Therefore, in order to remove the motor from its base 56, the nuts 48 have first to be threaded clear out of the annular slot portions 52 whereupon the bolts 42 may freely pass through the restricted slot portions 57. The nuts 48 normally bear against washers 58, received by the bolts 42, and urge the same firmly into engagement with the adjacent bracket members 24. As best shown in Fig. 3, the base 56 considerably clears the annular shoulder 60 of a nut 48 wherefore the latter has no tendency to clamp the washer 58 also against the base 56. In this manner the motor may freely rotate on its base 56 by intermediation of the nuts 48. A lock-nut 62 prevents the loosening of each nut 48.

It is obvious from the foregoing that the rubber members 26 of the brackets 22 sustain the weight of the motor. Consequently any noises or vibrations, originating in the motor, must necessarily pass through the rubber parts 26 of the brackets in order to be transmitted to the motor base 56. However, the relatively soft rubber material of the parts 26 has not only relatively large rotative or torque resiliency which will properly absorb large torque shocks in the motor as well as motor vibrations, but this material has also the quality of absorbing motor noises such as humming for instance. Hence, with the interposition of rubber to sustain the motor weight before it is taken up by the motor base, the operation of the motor is rendered most quiet and free of appreciable vibration.

Referring more particularly to Fig. 2 there is shown a spring urged device 70 which normally rocks the motor about its pivotal support in a direction such as to tighten a belt (not shown) which is driven by the motor by means of a pulley (not shown) on the motor shaft 14 and which drives any desirable load such as for instance a compressor for refrigeration purposes. This device 70 includes a rod 72 which passes through the boss 74 of a bracket 76 which is pivotally mounted at 78 to one of the thru-bolts 18. The lower reduced end of rod 72 passes through the flange 80 of a lug 82 which extends from the motor base 56. The boss 74 of bracket 76 is provided with two opposite beveled points 84 against which bears normally a washer 86 which is maintained in engagement with said beveled points by means of a compression spring 88, surrounding the rod 72 and bearing against a nut 90 which is threaded over a portion of said rod 72. Bearing against an annular shoulder 92 of rod 72 is a dished washer 94 which rests against a soft rubber cushion 96 on top of flange 80. A washer 98 and cotter-pin 100 prevents axial removal of rod 72 from flange 80, whereas a washer 102 which is screwed onto the rod 72 at 104 prevents axial removal of said rod from the boss 74 of bracket 76. It is obvious that the pre-compressed spring 88 normally rocks the motor counter-clockwise about its pivot support as viewed in Fig. 2, so as to tension the earlier mentioned but undisclosed belt. The rubber member 96 takes up all the reactionary force which is caused by the compression of the spring 88 and furthermore prevents transmission of motor noises and motor vibrations to the motor base 56 as can be readily understood.

While the embodiment of the present invention as herein disclosed, constitutes a preferred form, it is to be understood that other forms might be adopted, all coming within the scope of the claims which follow.

I claim:

1. In combination with an electric motor, a bracket mounted on each motor end; axially aligned studs, one projecting from each bracket; a motor base having two slots extending at right-angles to the studs, said slots having a narrow portion through which the studs may pass and a wider annular portion; and a member secured to each stud and having a cylindrical portion projecting into an annular slot portion for pivotally supporting the motor on the base.

2. In combination with an electric motor, a bracket mounted on each motor end; axially aligned bolts, one projecting from each bracket; a motor base having two slots extending at right angles to the bolts, said slots having a narrow portion through which the bolts may pass and a wider annular portion; and a nut threaded over each bolt and projecting into an annular slot portion for pivotally supporting the motor on the base.

3. In combination with an electric motor, a bracket mounted on each motor end; axially aligned bolts, one projecting from each bracket; a motor base having two slots extending at right angles to the bolts, said slots having a narrow portion through which the bolts may pass and a wider annular portion; and a nut threaded over each bolt and having a reduced annular portion projecting into an annular slot portion for pivotally supporting the motor on the base, and an annular shoulder engaging the base thereby preventing end-play of the motor relative to said base.

4. In combination with an electric motor, two brackets, each comprising two metal parts and a non-metallic member interposed between the metal parts and being secured thereto and a metal part of each bracket being secured to a motor end; axially aligned studs projecting from the other metal parts of the brackets; a motor base having two slots extending at right angles to the studs, said slots having a narrow portion through which the studs may pass and a wider annular portion; and a member secured to each stud and having a cylindrical portion projecting into an annular slot portion for pivotally supporting the motor on the base.

5. In combination with an electric motor, two brackets, each comprising two metal parts and a soft rubber member interposed between the metal parts and being secured thereto and a metal part of each bracket being secured to a motor end; axially aligned studs extending from the other metal parts of the brackets; a motor base having two slots extending at right angles to the studs, said slots having a narrow portion through which the studs may pass and a wider annular portion; and a member secured to each stud and having a cylindrical portion projecting into an annular slot portion for pivotally supporting the motor on the base.

6. In combination with an electric motor, two brackets, each comprising two metal parts and a non-metallic member interposed between the metal parts and being secured thereto, a metal part of each bracket being secured to a motor end and the other metal part of each bracket having an opening; a bolt extending through each opening and having a head interposed between said other metal part and the non-metallic member of a bracket; a motor base having two slots extending at right angles to the bolts, said slots having a narrow portion through which the bolts may pass and a wider annular portion; and a nut threaded over each bolt and having a reduced cylindrical portion projecting into an annular slot portion for pivotally supporting the motor on the base.

7. In combination with an electric motor, two brackets, each comprising two metal parts and a non-metallic member interposed between the metal parts and being secured thereto, a metal part of each bracket being secured to a motor end and the other metal part of each bracket having an opening; a bolt extending through each opening and having a head interposed between said other metal part and the non-metallic member of a bracket; a motor base having two slots extending at right angles to the bolts, said slots having a narrow portion through which the bolts may pass and a wider annular portion; and a nut threaded over each bolt and having a reduced cylindrical portion projecting into an annular slot portion for pivotally supporting the motor on the base, and an annular shoulder engaging the base thereby preventing end-play of the motor relative to said base.

8. In combination with an electric motor, two brackets, each comprising two metal parts and a soft-rubber member interposed between the metal parts and being vulcanized thereto, a metal part of each bracket being secured to a motor end and the other metal part of each bracket having an opening; a bolt extending through each opening and having a head interposed between said other metal part and the rubber member of a bracket; a motor base having two slots extending at right angles to the bolts, said slots having a narrow portion through which the bolts may pass and a wider annular portion; and a nut threaded over each bolt and drawing the head thereof into firm engagement with the adjacent metal part of a bracket, each of said nuts having a reduced cylindrical portion projecting into an annular slot portion for pivotally supporting the motor on the base.

9. In combination with an electric motor, two brackets, each comprising two metal parts and a soft rubber member interposed between the metal parts and being vulcanized thereto, a metal part of each bracket being secured to a motor end and the other metal part of each bracket having an opening; a bolt extending through each opening and having a head interposed between said other metal part and the rubber member of a bracket; a motor base having two slots extending at right angles to the bolts, said slots having a narrow portion through which the bolts may pass and a wider annular portion; and a nut threaded over each bolt and drawing the head thereof into firm engagement with the adjacent metal part of a bracket, each of said nuts having a reduced cylindrical portion projecting into an annular slot portion for pivotally supporting the motor on the base, and an annular shoulder in close proximity to the base thereby preventing end-play of the motor relative to said base.

10. In combination with an electric motor, axially aligned projections on the motor ends; a base having parallel, spaced slots with a narrow portion through which the projections may pass and a wider annular portion; and a member secured to each projection and having a cylindrical portion journaled in an annular slot portion.

11. In combination with an electric motor, axially aligned projections on the motor ends; a base having parallel, spaced slots with a narrow portion through which the projections may pass and a wider annular portion; and a member secured to each projection, said members having cylindrical portions journaled in the annular slot portions and shoulders adjacent base portions to prevent excessive end-play of the motor relative to the base.

12. In combination with an electric motor having metallic motor ends, brackets secured to the motor ends and providing axially aligned metallic projections, said brackets including non-metallic members isolating the metallic motor ends from the metallic projections; a base having parallel, spaced slots with a narrow portion through which the projections may pass and a wider annular portion; and a member secured to each projection and having a cylindrical portion journaled in an annular slot portion.

13. In combination with an electric motor, projections on the motor ends; a base having an opening for receiving a projection of one motor end, and a slot with a wide portion and a narrower portion through which a projection of the other motor end may pass; and a member secured to the projection of said other motor end and fitting into the wide slot portion.

ZERBE C. BRADFORD.